United States Patent
Min et al.

(10) Patent No.: US 10,978,683 B2
(45) Date of Patent: Apr. 13, 2021

(54) METHOD OF MANUFACTURING BATTERY CELL INCLUDING REFERENCE ELECTRODE FOR MEASURING RELATIVE ELECTRODE POTENTIAL, AND BATTERY CELL MANUFACTURED THEREFROM

(71) Applicant: LG Chem, Ltd., Seoul (KR)

(72) Inventors: Ji Won Min, Daejeon (KR); Sun Hwak Woo, Daejeon (KR); Seok Koo Kim, Daejeon (KR); Sei Woon Oh, Daejeon (KR); Eun Ju Lee, Daejeon (KR)

(73) Assignee: LG Chem, Ltd.

( * ) Notice: Subject to any disclaimer, the term of this patent is extended or adjusted under 35 U.S.C. 154(b) by 490 days.

(21) Appl. No.: 15/743,797

(22) PCT Filed: Aug. 18, 2016

(86) PCT No.: PCT/KR2016/009063
§ 371 (c)(1),
(2) Date: Jan. 11, 2018

(87) PCT Pub. No.: WO2017/034210
PCT Pub. Date: Mar. 2, 2017

(65) Prior Publication Data
US 2018/0205049 A1     Jul. 19, 2018

(30) Foreign Application Priority Data
Aug. 24, 2015   (KR) .................. 10-2015-0118607

(51) Int. Cl.
*H01M 2/10*       (2006.01)
*H01M 10/058*     (2010.01)
(Continued)

(52) U.S. Cl.
CPC .......... *H01M 2/1016* (2013.01); *H01M 2/16* (2013.01); *H01M 4/0445* (2013.01);
(Continued)

(58) Field of Classification Search
None
See application file for complete search history.

(56) References Cited

U.S. PATENT DOCUMENTS

2010/0086838 A1    4/2010  Kirchev
2011/0250478 A1   10/2011  Timmons et al.
(Continued)

FOREIGN PATENT DOCUMENTS

JP    2010080299 A    4/2010
JP    2010517032 A    5/2010
(Continued)

OTHER PUBLICATIONS

Search report from International Application No. PCT/KR2016/009063, dated Nov. 21, 2016.

*Primary Examiner* — Amanda J Barrow
(74) *Attorney, Agent, or Firm* — Lerner, David, Littenberg, Krumholz & Mentlik, LLP

(57) ABSTRACT

The present invention provides a method of manufacturing n battery cells (n≥2), each including a respective reference electrode for measuring a relative electrode potential, including: (i) manufacturing a reference cell composed of an electrolyte solution, the reference electrodes, and a lithium electrode; (ii) charging the reference cell; (iii) charging the reference cell to 40% to 60% of a capacity discharged in the process (ii), thereby performing formation on the reference electrodes; (iv) manufacturing the n battery cells, each of the battery cells including a respective one of the reference electrodes, an electrode assembly, the electrolyte solution and a battery case; and (v) in each of the battery cells,
(Continued)

measuring a relative potential of the respective one of the reference electrodes and a positive electrode of the respective electrode assembly, and a relative potential of the respective one of the reference electrodes and a negative electrode of the respective electrode assembly.

16 Claims, 11 Drawing Sheets

(51) Int. Cl.

| | |
|---|---|
| *H01M 10/44* | (2006.01) |
| *H01M 2/16* | (2006.01) |
| *H01M 4/134* | (2010.01) |
| *H01M 4/485* | (2010.01) |
| *H01M 10/0525* | (2010.01) |
| *H01M 4/04* | (2006.01) |
| *H01M 4/38* | (2006.01) |
| *H01M 4/02* | (2006.01) |

(52) U.S. Cl.
CPC ........... *H01M 4/134* (2013.01); *H01M 4/382* (2013.01); *H01M 4/485* (2013.01); *H01M 10/058* (2013.01); *H01M 10/0525* (2013.01); *H01M 10/44* (2013.01); *H01M 10/441* (2013.01); *H01M 10/446* (2013.01); *H01M 2004/021* (2013.01); *H01M 2220/30* (2013.01)

(56) References Cited

U.S. PATENT DOCUMENTS

| | | |
|---|---|---|
| 2012/0027926 A1 | 2/2012 | Miyuki et al. |
| 2013/0009604 A1 | 1/2013 | Bhardwaj et al. |
| 2014/0023888 A1 | 1/2014 | Fulop et al. |

FOREIGN PATENT DOCUMENTS

| | | |
|---|---|---|
| JP | 2012033365 A | 2/2012 |
| JP | 2014207174 A | 10/2014 |
| KR | 20060068117 A | 6/2006 |
| KR | 20120009661 A | 2/2012 |
| KR | 20130134242 A | 12/2013 |
| KR | 20130134542 A | 12/2013 |
| KR | 20150005085 A | 1/2015 |
| WO | 2014204479 A1 | 12/2014 |
| WO | 2015127442 A1 | 8/2015 |

…

METHOD OF MANUFACTURING BATTERY CELL INCLUDING REFERENCE ELECTRODE FOR MEASURING RELATIVE ELECTRODE POTENTIAL, AND BATTERY CELL MANUFACTURED THEREFROM

CROSS-REFERENCE TO RELATED APPLICATIONS

The present application is a national phase entry under 35 U.S.C. § 371 of International Application No. PCT/KR2016/009063, filed Aug. 18, 2016, which claims priority from Korean Patent Application No. 10-2015-0118607, filed on Aug. 24, 2015, in the Republic of Korea, the disclosures of which are incorporated herein by reference.

TECHNICAL FIELD

The present invention relates to a battery cell including a reference electrode for measuring a relative electrode potential.

BACKGROUND

As the technology development and demand for mobile devices are increased, demand for rechargeable batteries as an energy source is rapidly growing, and accordingly, a lot of research on a rechargeable battery cell satisfying various needs is being conducted.

Particularly, demand for a lithium rechargeable battery cell such as a lithium ion battery and a lithium ion polymer battery, having merits such as high energy density, discharge voltage and output stability is high.

Meanwhile, an electrode potential of a battery is measured for developing a new battery cell, and confirming performance of the manufactured battery cell.

For measuring an electrode potential, a method of measuring an electrode potential in a three-electrode system composed of a reference electrode, a working electrode, and a potential electrode is mainly used.

The reference electrode is an electrode which is, for measuring the potential of an electrode forming a battery or an electrode where electrolysis occurs, used in manufacturing a battery circuit for electrode potential measurement in combination, and is used as a potential standard when measuring a relative value of an electrode potential.

This reference electrode should satisfy the requirements such as following the Nernst equilibrium equation as a reversible electrode potential (an electrode in a reversible state), having a nonpolarizing characteristic to maintain a constant potential value at all time, having as little liquid potential difference as possible, having a small potential change even with a temperature change, and representing a constant potential value at a constant temperature.

One reference electrode is combined per a battery cell, for measuring an electrode potential, and in order to increase reliability of the reference electrode, a process of activating the reference electrode to have a plateau potential having no change in the potential due to charging and discharging is carried out.

This activation process is generally to apply a microcurrent to the reference electrode and a positive electrode of the battery cell to repeatedly charge and discharge the battery cell, while performing formation of a plateau section ('a plateau potential') where the reference electrode has a constant electrode potential.

However, this activation process is to estimate the potential or plateau potential of the reference electrode with a potential difference between the positive electrode of a battery cell and the reference electrode, and the potential may be different from the actual potential of the reference electrode, or the potential of the activated reference electrode may not actually be the plateau potential.

As such, in the case that the potential of the reference electrode is inaccurate, or the potential of the positive and negative electrodes of the battery cell is measured in the state of a non-plateau potential, the measured potential may be different from the actual potential of the positive and negative electrodes, and thus, the measurement method of the potential using the reference electrode is difficult to be reliable.

Furthermore, a trace amount of lithium migrates from a positive electrode to a reference electrode in the course of activation, and then the electrode capacity of the positive electrode may be finely decreased by the lost lithium ions in the positive electrode.

Besides, in the case that the battery cells are produced in large quantities, the activation process should be performed after one reference electrode is combined per one battery cell, and thus, the manufacturing process of the battery cells takes a long time.

Accordingly, there is currently a high need for technique allowing the activation process of the reference electrode to be easily performed, and accurate measurement of the electrode potential of the reference electrode, and through this reference electrode, enabling highly reliable measurement of the electrode potential of the battery cell.

Technical Problem

The present invention has been made in an effort to provide a method of manufacturing a battery cell including a reference electrode for measuring a relative electrode potential, and a battery cell manufactured therefrom having advantages of solving the problems of the relevant art as described above, and overcoming the technical challenges which have been requested from the past.

Specifically, the object of the present invention is, first, to reduce time taken for this process by simultaneously activating a plurality of reference electrodes, second, to perform formation on each of the plurality of reference electrodes so that they have an exact plateau potential, and lastly, to provide a method of manufacturing a battery cell, rendering the reference electrode to be directly involved in an electrochemical reaction of the positive and negative electrodes in the inside of the battery cell, thereby allowing highly reliable measurement of the electrode potential, and also having no performance degradation due to the reference electrode, and a battery cell manufactured therefrom.

Technical Solution

An exemplary embodiment of the present invention provides a method of manufacturing n battery cells (n≥2) each including a respective reference electrode for measuring a relative electrode potential, the method including: (i) manufacturing a reference cell composed of an electrolyte solution, the reference electrodes, and a lithium electrode; (ii) charging the reference cell by applying a microcurrent, and then discharging the reference cell immediately thereafter; (iii) charging the reference cell to 40% to 60% of a capacity discharged in the process (ii), thereby performing formation on the reference electrodes so that the reference electrodes have a plateau potential simultaneously; (iv) manufacturing then battery cells, each of the battery cells including a respective one of the reference electrodes subjected to formation, an electrode assembly, the electrolyte solution and a battery case; and (v) in each of the battery cells, measuring a relative potential of the respective one of the reference electrodes subjected to formation and a positive electrode of the respective electrode assembly, and a relative potential of the respective one of the reference electrodes and a negative electrode of the respective electrode assembly.

That is, by forming a reference cell with a plurality of reference electrodes and a lithium electrode, and then performing formation on the plurality of reference electrodes so that they have a plateau potential simultaneously, the method according to the present invention may significantly reduce time taken for the activation process, as compared with a method of combining each of reference electrodes with a battery cell, and then activating the reference electrodes.

Besides, the method of the present invention measures a potential of the reference electrode, not by a potential difference between the positive electrode of a battery cell and the reference electrode, but by a lithium electrode of which the potential is already known, thereby allowing more accurate measurement of the electrode potential of the reference electrode.

As such, the lithium electrode having a known potential may be a plate electrode composed of pure lithium, and the reference electrode subjected to formation may include lithium ions received from the lithium electrode in the processes (ii) and (iii).

The lithium ions of the lithium electrode present in the reference electrode may be provided from the reference electrode to a positive electrode in the process (V), and positively involved in the capacity of the battery cell. The reference electrodes are all the electrodes having plateau potentials of 1.52 V to 1.54 V, and the plateau potential may be determined proportionally to an electrode active material content. Therefore, the reference electrodes may be subjected to formation of a plateau potential of 1.52 V to 1.54 V, specifically a plateau potential of 1.53 V.

In the reference cell, each of the reference electrodes forms a positive electrode, the lithium electrode forms a negative electrode, and in the process (iii), the reference electrodes are independently subjected to formation, respectively. Herein 'being independently subjected to formation' refers to each of the reference electrodes being independently electrochemically reacted with the lithium electrode.

The method of the present invention further includes (a) forming the reference cell with a sample electrode identical to the reference electrode and a lithium electrode, and then performing formation of the electrode potential of the sample electrode identically to the processes (ii) and (iii), thereby predetermining formation conditions including a microcurrent size, charge time, discharge time and/or formation time, wherein the processes (i) to (iii) are carried out, based on the formation conditions predetermined in the process (a).

Since when the process (a) is thus carried out, the formation conditions for being applied to the reference electrodes may be predetermined, and thus, a plurality of reference electrodes may be subjected to formation more accurately and rapidly, in the activation process for the reference electrodes, that is, the processes (ii) and (iii).

Meanwhile, since generally the reference electrode acts as resistance to the electrochemical reaction of the positive and negative electrodes of the battery cell, the electrode potential is measured in a state that the reference electrode is disposed on the exterior of the positive and negative electrodes. However, this measurement method does not match an actual electrode potential in the actual battery cell, since the reference electrode is positioned on the exterior of the electrodes, not between the positive electrode and the negative electrode where the actual electrochemical reaction occurs.

Thus, the method of the present invention is configured to measure the relative potential of the positive and negative electrodes of the battery cell, while minimizing the resistance increase due to the reference resistance, by disposing the reference electrode at a position where the actual electrochemical reaction occurs.

Specifically, in the method of the present invention, the process (iv) may include mounting the reference electrode between a separator and the negative electrode, with the reference electrode facing the negative electrode, laminating the positive electrode thereon with the separator interposed therebetween so that the positive electrode faces the negative electrode and the reference electrode, thereby forming an electrode assembly, and storing the electrode assembly and an electrolyte solution in a battery case, and then sealing the case, thereby manufacturing the battery cell.

Accordingly, in the present invention, the reference electrode allows highly reliable measurement of an electrode potential by measuring the relative potential of each of the positive and negative electrodes at the position where the actual electrochemical reaction occurs.

As a specific example, the reference electrode may include a main body having a wire structure composed of copper (Cu) or aluminum (Al); an electrode portion disposed on one side end part of the main body, and having an electrode active material coated on the surface; and a separation film preventing electrical short circuit between the electrode portion and the positive or negative electrode, and configured to allow lithium ions to migrate between the positive electrode and the electrode portion.

That is, the reference electrode having a wire structure of small volume is disposed between the positive electrode and the negative electrode, thereby hardly affecting the volume of the battery cell, and also has a small area closely adhering to the negative electrode, thereby having low contact resistance.

Generally, in the case that the reference electrode is disposed on the exterior of the positive and negative electrodes, there is a difference between a migration distance of lithium ions reversibly migrating between the positive electrode and the negative electrode, and a migration distance of lithium to the reference electrode, and thus, the electrode potential depending on the actual usage environment of the battery cell may not be measured precisely.

Here, for disposing the reference electrode between the positive electrode and the negative electrode, two separators should be interposed between the positive electrode and the negative electrode, and the reference electrode should be interposed between the separators so that the short circuit due to contact between the electrodes is prevented, however, such structure is difficult to be realized due to the demerits as described below.

First, since a pair of the separators interposed between the positive electrode and the negative electrode considerably restrict the migration of lithium ions, the battery cell as configured above has a low output characteristic.

Second, on the interface where the separators come into contact with each other, high contact resistance is formed, and as a result, internal resistance of the battery cell is increased, so that the battery cell having desired performance may not be implemented.

That is, in order to dispose the reference electrode between the positive electrode and the negative electrode where the actual electrochemical reaction occurs, the resistance increase due to the arrangement of the reference electrode in the inside of the battery cell should be overcome.

Here, in the present invention, as described above, since the reference electrode has a wire structure having small volume and area, resistance due to the contact with the negative electrode may be greatly decreased.

In addition, according to the findings of the inventors of the present invention, it was confirmed that the reference electrode having a structure in which a separation film having a small area wraps only the electrode portion formed on one side of the main body, even in the case of being disposed between the separator and the negative electrode, forms the resistance due to the contact between the separation film and the separator at a very low value, thereby not affecting the actual performance of the battery cell.

In the reference electrode, the separation film may be formed in a cap shape wrapping the electrode portion. In this structure, the separation film may wrap the electrode portion with minimum volume and area, thereby further decreasing the contact resistance.

Herein, the cap shape refers to a thimble shape in which one side end part of the main body and the both surfaces of the electrode portion adjacent to this end part are not exposed to the outside, wherein the separation film may be stuck or adhered on the surface of the electrode portion, in a state of wrapping the electrode portion.

In the non-limiting example of the separation film, the separation film may be composed of a material selected from the group consisting of organic/inorganic composite porous SRS separators (safety-reinforcing separators), a polyolefin-based polymer, a polyester-based polymer, a polycarbonate-based polymer and glass fiber, and specifically, the SRS separators (safety-reinforcing separators) which do not generate heat shrinkage due to the thermal resistance of inorganic particles, and have excellent ductility, and high mechanical stiffness.

Further, it is preferred that the separation film is thin so that the gap occurring between the separator and the negative electrode due to its thickness is minimized. However, in the case that the separation film is unduly thin, the mechanical stiffness of the separation film is weak, and thus, when the reference electrode flows by impact or vibration, the separation film may be torn by friction, thereby causing electrode short circuit, and accordingly, appropriate mechanical stiffness is required. Specifically, it is preferred that the separation film has a thickness equal to or less than half the separator thickness, more preferably has a thickness of 10% to 50% of the separator thickness.

The reference electrode may be mounted on the electrode assembly so that the other side end part of the main body is extended to the outside of the battery case, with the electrode portion being interposed between the separator and the negative electrode.

That is, the reference electrode has a wire structure of being extended from the inside to the outside of the battery cell, and the user may conveniently measure the relative potential by connecting a potential measuring apparatus to the reference electrode on the outside, and if required, may use the battery cell with the extended wire being cut.

Herein, for the reference electrode, an electrically insulating film or resin may be coated on the remaining portion except the electrode portion in the main body so that the electrical insulation to the negative electrode may be ensured, and specifically an enamel resin may be used, but not limited thereto.

Since the electrode active material has low reactivity to an electrolyte solution, it is not greatly limited as long as it is a stable material allowing slow degradation of the electrode and not interfering with reversibility of lithium ions, and specifically it may be lithium titanium oxide (LTO) having high structural stability and allowing slow electrode degradation.

The electrode active material may be included in the reference electrode at 0.001% to 5% by weight, based on the total weight of the electrode active material of the negative electrode.

It is not preferred that the content of the electrode active material is less than 0.001% based on the total weight of the electrode active material of the negative electrode, since the reference electrodes are not sufficiently coated, and thus, there is a risk of shorting, and it is also not preferred that the content is more than 5% by weight, since the reference electrode itself may act as resistance.

The electrode portion may have a thickness of 0.1% to 20% relative to the thickness of the negative electrode. When the thickness of the electrode portion is less than 0.1% which is the minimum value of the range, the coating amount of the electrode active material is unduly small so that the electrode portion may not be utilized as the reference electrode for relative potential measurement, and when the thickness is more than 20% which is the maximum value of the range, an excessive gap between the separator and the negative electrode may be caused by the electrode portion, and thus, such thickness is not preferred.

The present invention also provides a battery cell manufactured by the above method.

The type of battery cell of the present invention is not particularly limited, however, as a specific example, it may be a lithium rechargeable battery such as a lithium ion (Li-ion) rechargeable battery, a lithium polymer (Li-polymer) rechargeable battery, or a lithium ion polymer (Li-ion polymer) rechargeable battery, having merits such as high energy density, discharge voltage and output stability.

Generally, the lithium rechargeable battery is composed of a positive electrode, a negative electrode, a separator, and a lithium salt-containing non-aqueous electrolyte.

The positive electrode is manufactured, for example, by coating a mixture of a positive active material, a conductive material and a binder on a positive electrode current collector and/or an extension current collecting part, and then drying it, and if necessary, a filler may be further added to the mixture.

The positive electrode current collector and/or the extension current collecting part may be generally manufactured to have a thickness of 3 to 500 μm. These positive electrode current collector and extension current collecting part are not particularly limited as long as they do not cause chemical changes in the battery and have high conductivity, and for example, stainless steel, aluminum, nickel, titanium, sintered carbon, or aluminum or stainless steel of which the surface is treated with carbon, nickel, titanium, sliver and the like, may be used. The positive electrode current collector and the extension current collecting part may have higher adhesion strength to the positive active material by forming fine protrusions and depressions on the surface thereof, and may be formed in various shapes such as a film, a sheet, a foil, nets, a porous body, foam and a non-woven fabric body.

The positive active material may include layered compounds or compounds substituted with one or more transition metals such as lithium cobalt oxide ($LiCoO_2$) and lithium nickel oxide ($LiNiO_2$); lithium manganese oxides of the chemical formulae of $Li_{1+x}Mn_{2-x}O_4$ (wherein x is 0-0.33), $LiMnO_3$, $LiMn_2O_3$, $LiMnO_2$ and the like; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides represented by the chemical formula $LiNi_{1-x}M_xO_2$ (wherein M=Co, Mn, Al, Cu, Fe, Mg, B or Ga, and x=0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which some of Li of the chemical formula is substituted with an alkaline-earth metal ion; disulfide compounds; Fee $(MoO_4)_3$ and the like, but not limited thereto.

The conductive material is added at 1 to 30% by weight, based on the total weight of the mixture including the positive active material. This conductive material is not particularly limited as long as it does not cause chemical changes in the battery, and has conductivity, and for example, graphite such as natural graphite or artificial graphite; carbon blacks such as carbon black, acetylene black, ketjen black, channel black, furnace black, lamp black and summer black; conductive fiber such as carbon fiber or metal fiber; metal powder such as carbon fluoride, aluminum and nickel powder; conductive whisky such as zinc oxide and potassium titanate; conductive metal oxides such as titanium oxide; conductive materials such as a polyphenylene derivative, and the like may be used.

The binder is a component assisting in binding the active material and the conductive material and the like, and binding for the current collector, and generally added at 1 to 30% by weight, based on the total weight of the mixture including the positive active material. The example of this binder may include polyfluorovinylidene, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers and the like.

The filler is a component suppressing the expansion of the positive electrode, and optionally used, and is not particularly limited as long as it does not cause chemical changes in the battery and is a fibrous material, and for example, olefin-based polymers such as polyethylene and polypropylene; fibrous materials such as glass fiber and carbon fiber, may be used.

The negative electrode is manufactured by coating the negative electrode active material on the negative electrode current collector and/or the extension current collecting part, and drying it, and if necessary, the components as described above may be optionally further included.

The negative electrode current collector and/or the extension current collecting part is/are manufactured generally to have a thickness of 3 to 500 µm. This/These negative electrode current collector and/or extension current collecting part is/are not particularly limited as long as it/they does/do not cause chemical changes in the battery and has/have conductivity, and for example, copper, stainless steel, aluminum, nickel, titanium, sintered carbon, or copper or stainless steel of which the surface is treated with carbon, nickel, titanium, silver and the like, aluminum-cadmium alloy, or the like may be used.

Further, like the positive electrode current collector, the binding force of the negative electrode active material may be strengthened by forming fine protrusions and depressions on the surface thereof, and various shapes such as a film, a sheet, a foil, nets, a porous body, foam and a non-woven fabric body may be used. The negative electrode active material may include, for example, carbon such as hard carbon, graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me:Mn, Fe, Pb, Ge; Me':Al, B, P, Si, groups 1, 2 and 3 elements of the periodic table, halogen; $0<x \leq 1$; $1 \leq y \leq 3$; $1 \leq z \leq 8$); lithium metal; lithium alloy; silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials, and the like.

The separator is interposed between the positive electrode and the negative electrode, and an insulating thin film having high ion permeability and mechanical strength is used. The separator has a pore diameter of generally 0.01-10 µm, and a thickness of 5-300 µm. As this separator, in addition to the organic/inorganic composite porous SRS separators (safety-reinforcing separators) as described above; for example, olefin-based polymers such as chemical resistant and hydrophobic polypropylene; a sheet or non-woven fabric made of glass fiber or polyethylene, and the like are used. In the case that a solid electrolyte such as a polymer is used as the electrolyte, the solid electrolyte may also serve as the separator.

The electrolyte solution may be a lithium salt-containing non-aqueous electrolyte solution, and is composed of a non-aqueous electrolyte solution and a lithium salt.

The non-aqueous electrolyte solution may include a non-aqueous organic solvent, an organic solid electrolyte, an inorganic solid electrolyte and the like, but not limited thereto. The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphate triester, trimethoxy methane, dioxolane derivative, sulfolane, methyl sulfolane, 1,3-dimethyl-2-imidazolidinone, propylene carbonate derivative, tetrahydrofuran derivative, ether, propionic acid methyl and ethyl propionate.

The organic solid electrolyte may include, for example, polyethylene derivatives, polyethylene oxide derivatives, polypropylene oxide derivatives, phosphate ester polymers, poly agitation lysine, polyester sulfide, polyvinyl alcohol, polyfluorovinylidene, polymers including an ionic dissociation group, and the like.

The inorganic solid electrolyte may include, for example, nitride, halides, sulfides or the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material which is readily soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4 phenyl lithium borate, imide, and the like may be used.

Further, to the non-aqueous electrolyte solution, for the purpose of improving charge and discharge characteristics, flame retardancy and the like, for example, pyridine, triethylphosphite, triethanolamine, cyclic ether, ethylene diamine, n-glyme, triamide hexaphosphate, nitrobenzene derivatives, sulfur, quinoneimine dyes, N-substituted oxazolidinone, N,N-substituted imidazolidine, ethylene glycol dialkyl ether, ammonium salts, pyrrole, 2-methoxy ethanol, aluminum trichloride, and the like may be added. In some cases, for imparting incombustibility, a halogen-containing solvent such as carbon tetrachloride and ethylene trifluoride may be further included, and for improving high temperature storage characteristics, carbon dioxide gas may be further included, and FEC (fluoro-ethylene carbonate), PRS (propene sultone) and the like may be further included.

As a specific example, a lithium salt such as $LiPF_6$, $LiClO_4$, $LiBF_4$, and $LiN(SO_2CF_3)_2$ is added to a mixed solvent of a cyclic carbonate of EC or PC which is a high dielectric solvent, and a linear carbonate of DEC, DMC or EMC which is a low viscosity solvent, thereby preparing a lithium salt-containing non-aqueous electrolyte.

The present invention also provides a battery pack and a device including one or more battery cells as the above.

DETAILED DESCRIPTION OF THE EMBODIMENT

Hereinafter, the present invention will be described, with reference to the drawings according to the exemplary embodiment of the present invention, however, this is for easier understanding of the present invention, and the scope of the present invention is not limited thereby.

Figure 1:
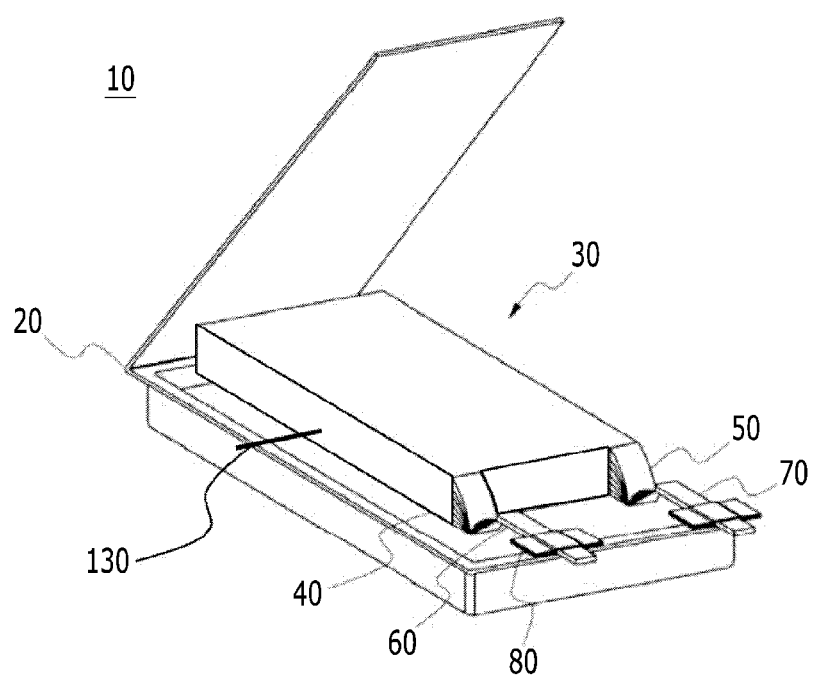
FIG. 1 is an exploded perspective view of the battery cell according to the present invention.
Figure 2:
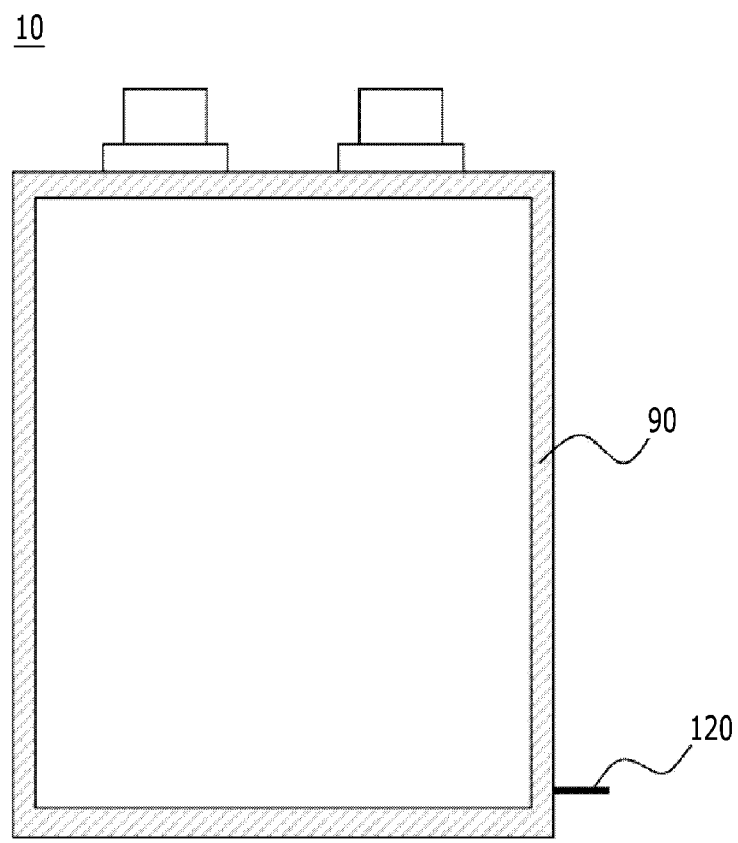
FIG. 2 is a plane schematic view of the battery cell of FIG. 1.

FIG. 1 illustrates an exploded perspective view of the battery cell according to the present invention, and FIG. 2 schematically illustrates a plane view of the battery cell.

Referring to FIG. 1, a battery cell 10 includes an electrode assembly 30, electrode tabs 40 and 50 extended from the electrode assembly 30, electrode leads 60 and 70 welded to the electrode tabs 40 and 50, and a battery case for accommodating the electrode assembly 30.

The electrode tabs 40 and 50 are extended from each of the electrode plates of the electrode assembly 30, and the electrode leads 60 and 70 are electrically connected to a plurality of electrode tabs 40 and 50 extended from each electrode plate, respectively, for example, by welding, and are partially exposed to the outside of the battery case 20. In addition, an insulation film 80 is adhered on a portion of the upper and lower surfaces of the electrode leads 60 and 70 for increasing a sealing degree with the battery case 20, simultaneously with ensuring an electrical insulation state.

The battery case 20 is composed of an aluminum laminate, provides a space for accommodating the electrode assembly 30, and has a pouch shape as a whole. The battery case 20 is sealed by thermal fusion, in which the electrode assembly 30 is accommodated therein with the electrolyte solution, and the electrode leads 60 and 70 outwardly protrude along with the outer circumference.

Here, the battery cell 10 includes the reference electrode 120 extended from one side end part to the outside of the electrode assembly 30, and the reference electrode 120 is partially drawn out to the outside through one side of the thermal fused outer circumference of the thermal fused battery case.

Figure 3:
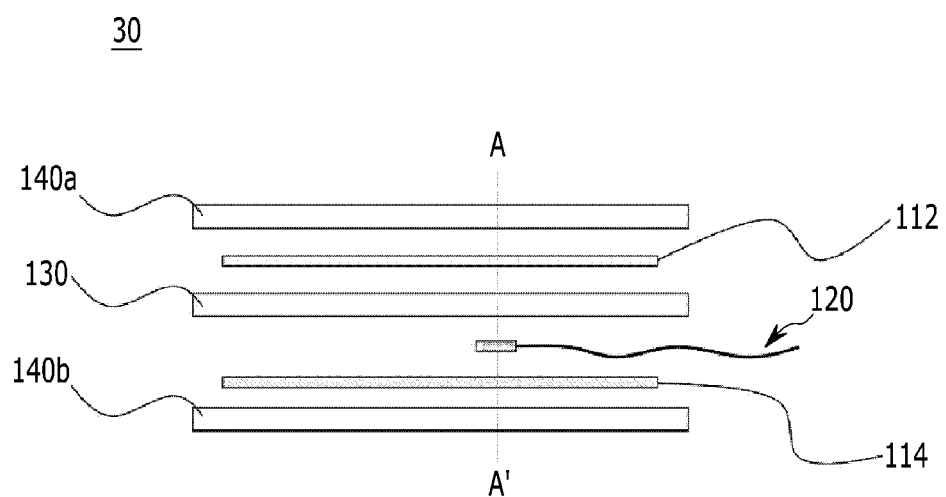
FIG. 3 is a schematic view of an electrode assembly.

FIG. 3 illustrates a schematic view of the electrode assembly of the present invention. Referring to FIG. 3, the electrode assembly includes a positive electrode 112, a negative electrode 114, a reference electrode 120 of the same polarity as the negative electrode 114, a separator, and a pair of outer separators 140a and 140b.

The electrode assembly 30 has a stacked structure, in which the reference electrode 120 is disposed between the separator and the negative electrode 114, the positive electrode 112 is disposed to face the negative electrode 114 and the reference electrode 120 with the separator 130 interposed therebetween, and on the surfaces of the positive electrode 112 and the negative electrode 114 which oppose the other surfaces of the positive electrode 112 and the negative electrode 114 facing each other, the outer separators 140a and 140b are disposed, respectively.

Herein, the reference electrode 120 partially protrudes to the outside of the electrode assembly 30, with the components of the electrode assembly 30 being laminated, as shown in FIG. 1, and the protruding part may be extended from the electrode assembly 30 to the outside of the battery cell 10, through the thermal fused portion, as shown in FIG. 2.

The reference electrode 120 is a reference electrode for measuring a relative potential for each of the positive electrode 112 and negative electrode 114 inside of the battery case 20, and since the reference electrode 120 is disposed between the positive electrode 112 and the negative electrode 114 where the actual electrochemical reaction occurs, the battery cell according to the present invention may allow precise measurement of the relative potential for each of the positive electrode 112 and the negative electrode 114.

Figure 4:
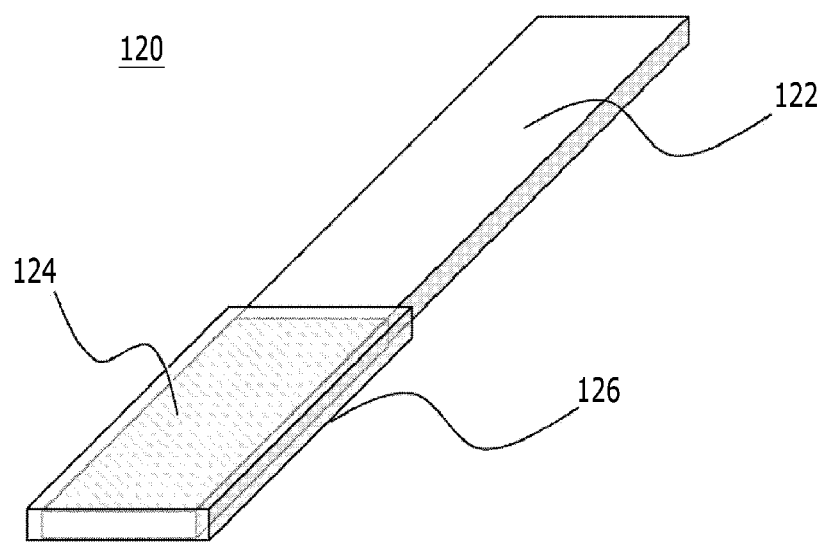
FIG. 4 is a schematic view of a reference electrode.

The structure of the reference electrode 120 is specifically illustrated in FIG. 4. Referring to FIG. 4, the reference electrode 120 includes a main body 122 having a wire structure, in which the length is extended so that it may protrude from the inside of the electrode assembly 30 to the outside of the battery cell 10, and an electrode portion 124 having lithium titanium oxide (LTO) which is the negative electrode active material of the reference electrode 120, coated on a portion of the surface adjacent to one side end part of the main body 122, as the reference electrode active material.

The reference electrode 120 further includes a separation film 126 configured to prevent electrical short circuit between the electrode portion 124 and the negative electrode 114, and allow lithium ion migration between the positive electrode 112 and the electrode portion 124.

The main body 122 has an overall rectangular wire structure, as shown in FIG. 4, and FIG. 4 shows that the lithium titanium oxide is coated on only the upper surface of the main body 122 in the electrode portion 124, however, in some cases, the lithium titanium oxide may be coated on the lower surface of the main body 122, the front surface of the main body 122, or both the upper and lower surfaces of the main body 122, based on the reference part 124.

Here, the upper surface is a surface facing the positive electrode 112, and the lower surface is a surface opposing the upper surface.

On the main body 122, an enamel resin which is an electrical insulating resin is coated on the remaining part except the electrode portion 124, and thus, the negative electrode 114 and the reference electrode 120 are not short-circuited even in the state that the reference electrode 120 is closely adhered to the negative electrode 114.

The separation film 126 has a cap shape in which only one side end part is opened so that the electrode portion 124 is wrapped, and thus, may completely wrap the electrode portion 124 with minimum volume and area.

Accordingly, even in the case that the electrode portion 124 of the reference electrode 120 is closely adhered to the negative electrode 114, the contact resistance formed in the close adhesion interface of the separation film 126 and the negative electrode 114 may be minimized, and also the occurrence of gap between the negative electrode 114 and the separator may be minimized.

The separation film 126 may also have a sticking agent or adhesive coated on the entire or portion of the inner surface thereof, in order to stably maintain the state of completely wrapping the surface of the electrode portion 124, and be composed of SRS separators (safety-reinforcing separators) having excellent adhesion and ductility.

Figure 5:
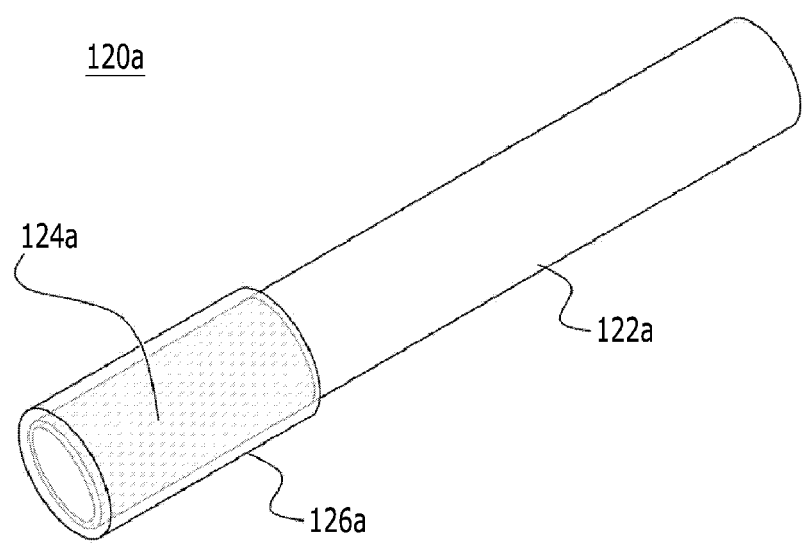
FIG. 5 is a schematic view of another structure of the reference electrode.

FIG. 5 schematically illustrates a reference electrode 120a having a structure different from FIG. 4. Referring to FIG. 5, the reference electrode 120a includes a main body 122a having a wire structure, in which the length is extended so that it may protrude from the inside of the electrode assembly to the outside of the battery cell, and an electrode portion 124a having lithium titanium oxide (LTO) which is the negative electrode active material of the reference electrode 120a, coated on a portion of the surface adjacent to one side end part of the main body 122a, as the reference electrode active material.

The reference electrode 120a further includes a separation film 126a configured to prevent electrical short circuit between the electrode portion 124a and the negative electrode 114, and allow lithium ion migration between the positive electrode 112 and the electrode portion 124a.

The main body 122a has a cylindrical wire structure, differently from the main body 122 illustrated in FIG. 4.

In this structure, the reference electrode active material is coated on the entire surface of the main body 122a, based on the electrode portion 124a, and the separation film 126a has a cylindrical cap shape, corresponding to the shape of the main body 122a.

Figure 6:
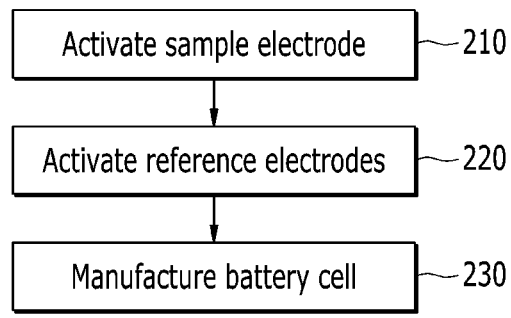
FIG. 6 is a flowchart of the manufacturing method according to the present invention.
Figure 7:
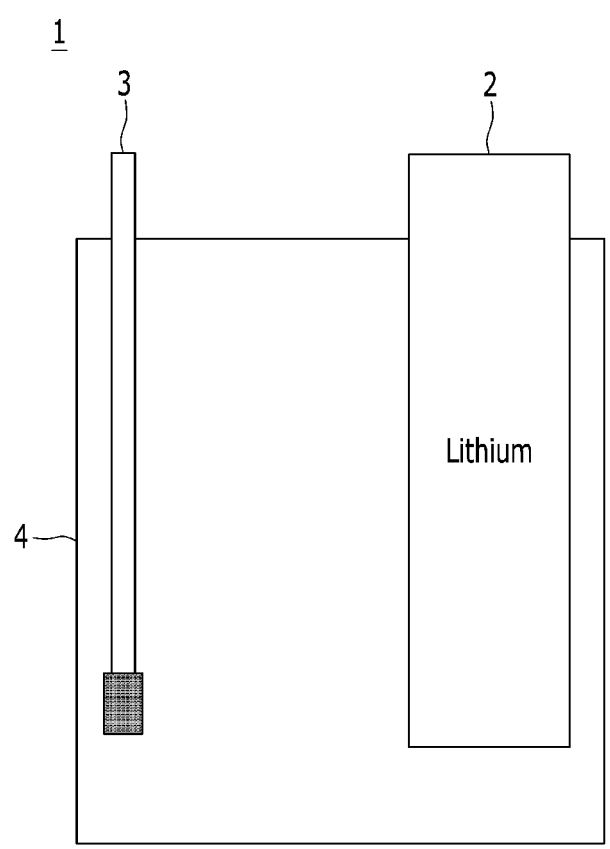
FIG. 7 is a schematic view of a reference cell including a sample electrode.
Figure 8:
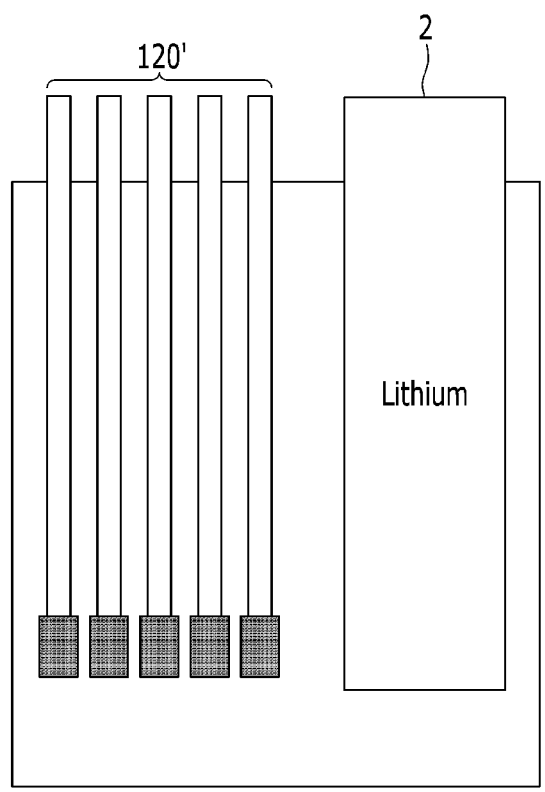
FIG. 8 is a schematic view of a reference cell including the reference electrodes.
Figure 9:
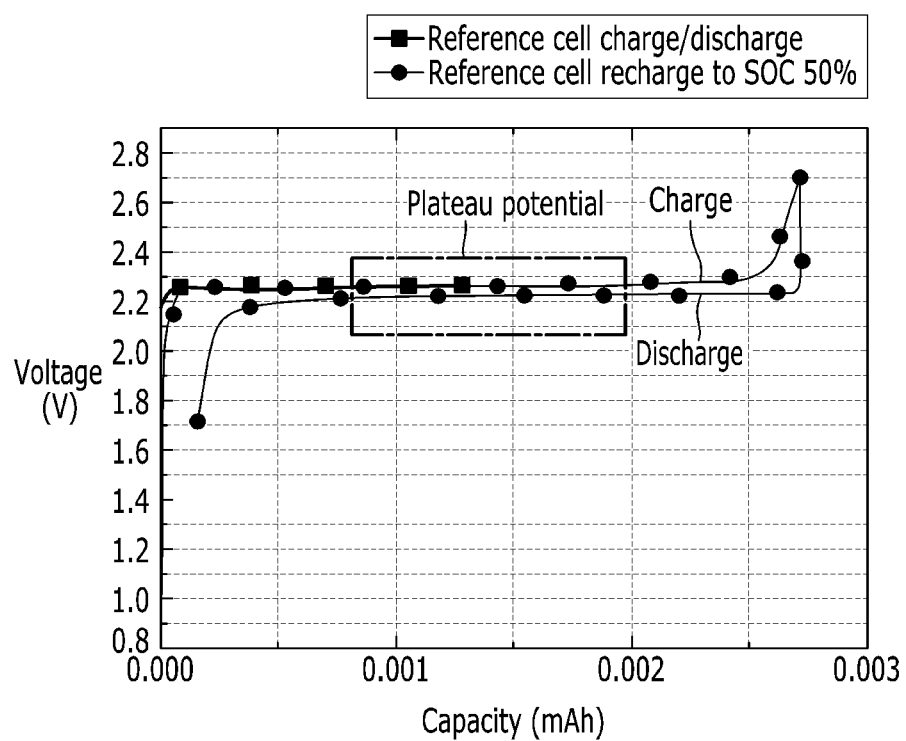
FIG. 9 is a voltage change graph of the reference cell.

Meanwhile, FIG. 6 illustrates a flow chart of the manufacturing method according to an exemplary embodiment of the present invention, FIGS. 7 and 8 illustrate the reference cell of the present invention, and FIG. 9 illustrates a voltage change graph of the reference cell.

The method according to the present invention will be described in detail, based on the structures of the battery cell and the reference electrode as illustrated in FIGS. 1 to 5.

First, referring to FIGS. 6, 7 and 9 together, the method of the present invention forms a reference cell 1 with a sample electrode 3 identical to the reference electrode 120 and a lithium electrode 2, and activates the sample electrode 3, in operation 210.

Herein, the reference cell 1 is composed of a main body 4 accommodating an electrolyte solution, and a lithium electrode 2 mounted inside of the main body 4, and the sample electrode 3 is separably mounted inside of the main body 4. The sample electrode 3 works as the positive electrode of the reference cell 1, and the lithium electrode 2 works as the negative electrode.

Then, a microcurrent of about 0.00001 mAh to 0.003 mAh is applied to the sample electrode 3 and the lithium electrode 2 to charge the reference cell 1, which is discharged immediately thereafter. Here, the microcurrent size is varied with the content of the electrode active material included in the sample electrode 3.

Here, after the reference cell 1 is completely charged, it is completely discharged, or repeatedly charged and discharged in the range of SOC 10% to SOC 90%, and when the voltage change of the reference cell 1 is measured during the course of charging and discharging as such, the results shown in FIG. 9 may be obtained.

Next, reference cell 1 is recharged to about 50% of the discharged capacity of the reference cell 1. Here, the reference cell 1 reaches a plateau section where there is substantially no voltage change, and as a result, the sample electrode 3 is also subjected to formation of a plateau potential. Here, an accurate electrode potential may be measured with a potential difference between the sample electrode 3 and the lithium electrode 2.

As described above, in the activation process using the sample electrode 3, the formation conditions including the microcurrent size, charge time, discharge time and formation time are confirmed and predetermined, and then operation 220 proceeds.

In this regard, referring to FIGS. 6, 8 and 9 together, the reference cell 1a is composed of a plurality of reference electrodes 120' and the lithium electrode 2 in operation 220, and each of the reference electrodes 120' is independently activated.

The reference electrodes 120' are separably mounted inside of the main body 4, respectively. The reference electrodes 120' work as the positive electrode of the reference cell 1a, and the lithium electrode 2 works as the negative electrode.

Then, the microcurrent which was applied to the formation on the sample electrode 3 is applied to each of the reference electrodes 120' and the lithium electrode 2 to charge the reference cell 1a, which was discharged immediately thereafter.

Here, the reference cell 1a composed of the reference electrodes 120' may be subjected to formation with the charge time, discharge time and formation time which was predetermined in the activation process using the sample electrode 3.

That is, identically to the activation process of the sample electrode 3, the reference cell 1a is charged and discharged, and then during the course of charging and discharging, the voltage change of the reference cell 1a is measured, the reference cell 1a is charged to about 50% of a discharged capacity, and when the reference cell 1a reaches a plateau section where there is substantially no voltage change of the reference cell 1a, the reference electrodes 120' is subjected to formation of a plateau potential. Further, the accurate electrode potential of the reference electrode 120' may be measured with a potential difference between the reference electrodes 120' and the lithium electrode 2.

In addition, since the sample electrode 3 is identical to the reference electrode 120', the electrode potential measured in the sample electrode 3 is substantially identical to the electrode potential of the reference electrodes 120'. Accordingly, only the process of formation on the reference electrodes 120' so that they have a plateau potential is carried out through operation 220, and a process of confirming a plateau section based on the voltage change of the reference cell 1a, and a process of measuring the electrode potential of each of the reference electrodes 120' may be omitted.

Each of the reference electrodes 120' of which the activation was thus completed may be manufactured into the battery cell as shown in FIGS. 1 to 5, with an electrode assembly, an electrolyte solution and a battery case in operation 230.

Figure 10:
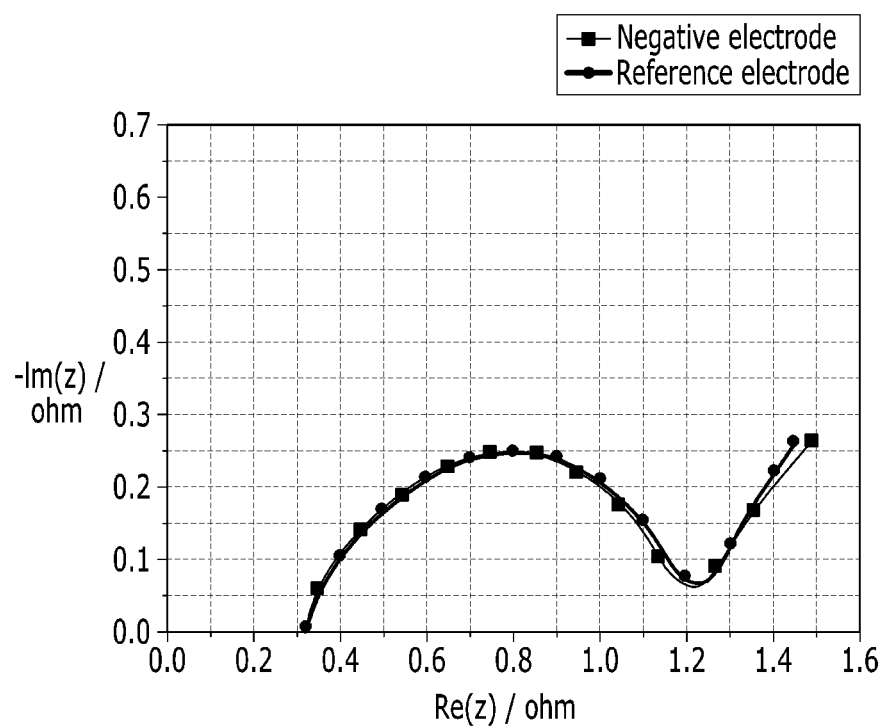
FIG. 10 is a graph comparing the resistance between the negative electrode in the battery cell and the reference electrode according to Example 1 of the present invention.
Figure 11:
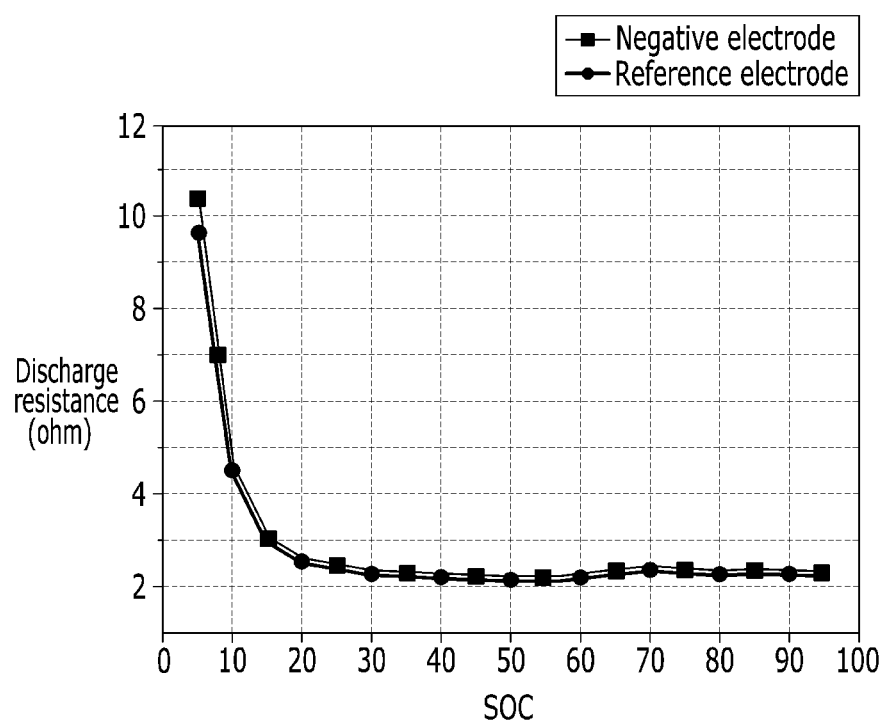
FIG. 11 is another graph comparing the resistance between the negative electrode in the battery cell and the reference electrode according to Example 1 of the present invention.

Meanwhile, FIGS. 10 and 11 illustrate graphs of resistance measurement of the battery cell according to the present invention.

Hereinafter, the experiments according to FIGS. 10 and 11 will be described in detail.

Example 1

As a positive electrode active material, 90% by weight of $LiNi_{0.6}Mn_{0.2}Co_{0.2}O_2$ which is a lithium nickel cobalt manganese composite oxide, 5% by weight of Super-P (conductive agent), and 5% by weight of PVdF (binder) were added to NMP, thereby preparing positive electrode mixture slurry. This was coated on one surface of aluminum foil, and dried and pressed, thereby manufacturing a positive electrode.

As a negative electrode active material, 96% by weight of a mixture of natural graphite and artificial graphite coated with amorphous carbon at a weight ratio of 95:5, 1% by weight of Super-P (conductive agent), 2% by weight of SBR (binder), 1% by weight of a thickener were added to $H_2O$ as a solvent, thereby preparing negative electrode mixture slurry, and coated on one surface of copper foil, and dried and pressed, thereby manufacturing a negative electrode.

As a reference electrode active material, 80% by weight of lithium titanium oxide, 5% by weight of Super-P (conductive agent), and 15% by weight of KF9130 (binder) (13% Solution) were added to NMP as a solvent, thereby preparing negative electrode mixture slurry. Thereafter, the coating of one side end part was removed from the wire which is composed of copper, and of which the surface is coated with an enamel resin. Thereafter, the slurry was coated on the one side end part of the wire from which the coating was removed, dried and pressed, thereby manufacturing a reference electrode.

A lithium battery cell was manufactured by using the positive electrode, the negative electrode and the reference electrode manufactured as described above and a carbonate electrolyte solution.

Experimental Example 1

The resistance of the negative electrode and the reference electrode was measured in the battery cell manufactured in Example 1, and is shown in FIG. 10.

According to FIG. 10, it is recognized that the negative electrode and the reference electrode have almost the same resistance value.

Experimental Example 2

After formation on the lithium battery cell manufactured in Example 1 at 4.2 V, resistance changes due to discharge of the negative electrode and the reference electrode were measured in all areas of SOC, and the results are shown in the following Table 1, and FIG. 11.

TABLE 1

|  | Negative electrode | Reference electrode | Rate of change (%) |
|---|---|---|---|
| SOC95 | 2.22 | 2.25 | 1.11 |
| SOC90 | 2.24 | 2.28 | 1.93 |
| SOC85 | 2.25 | 2.31 | 2.66 |
| SOC80 | 2.27 | 2.29 | 1.21 |
| SOC75 | 2.29 | 2.33 | 1.89 |
| SOC70 | 2.29 | 2.33 | 1.39 |
| SOC65 | 2.28 | 2.29 | 0.66 |
| SOC60 | 2.14 | 2.20 | 2.41 |
| SOC55 | 2.13 | 2.14 | 0.47 |
| SOC45 | 2.16 | 2.16 | −0.05 |
| SOC40 | 2.20 | 2.19 | −0.54 |
| SOC35 | 2.25 | 2.24 | −0.50 |
| SOC30 | 2.28 | 2.28 | −0.15 |
| SOC25 | 2.41 | 2.37 | 1.46 |
| SOC20 | 2.54 | 2.53 | 0.18 |
| SOC15 | 2.99 | 3.04 | 1.50 |
| SOC10 | 4.38 | 4.40 | 0.49 |
| SOC5 | 1035 | 9.69 | −6.33 |

According to Table 1 and FIG. 11, it is recognized that though in the battery cell according to the present invention, the reference electrode was disposed inside of the battery cell, specifically between the positive electrode and the negative electrode, there is substantially no difference in resistance from the negative electrode.

That is, the battery cell according to the present invention allows reliable electrode potential measurement, and almost no increase in internal resistance, by the structural characteristic of including the reference electrode inside.

It is possible for a person with ordinary skill in the art to which the present invention pertains to perform various applications and modification within the scope of the present invention, based on the description above.

As described above, by forming a reference cell with a plurality of reference electrodes and a lithium electrode, and then performing formation on the plurality of reference electrodes so that they have a plateau potential simultaneously, the method according to the present invention may significantly reduce time taken for the activation process, as compared with a method of combining each of reference electrodes with a battery cell, and then activating the reference electrodes.

Besides, the method of the present invention allows more accurate measurement of the electrode potential of a reference electrode, since the potential of the reference electrode is measured by a lithium electrode of which the potential is already known, not a potential difference between the positive electrode of a battery cell and the reference electrode.

The invention claimed is:

1. A method of manufacturing n battery cells (n≥2) each including a respective reference electrode for measuring a relative electrode potential, the method comprising:
   (i) manufacturing a reference cell composed of an electrolyte solution, the reference electrodes, and a lithium electrode;
   (ii) charging the reference cell by applying a microcurrent, and then discharging the reference cell immediately thereafter;
   (iii) charging the reference cell to 40% to 60% of a capacity discharged in the process (ii), thereby performing formation on the reference electrodes so that the reference electrodes have a plateau potential simultaneously;

(iv) manufacturing the n battery cells, each of the battery cells including a respective one of the reference electrodes subjected to formation, an electrode assembly, an electrolyte solution and a battery case; and (v) in each of the battery cells, measuring a relative potential of the respective one of the reference electrodes subjected to formation and a positive electrode of the respective electrode assembly, and a relative potential of the respective one of the reference electrodes and a negative electrode of the respective electrode assembly.

2. The method of claim 1, wherein the reference electrodes are all subjected to formation of a plateau potential of 1.52 V to 1.54 V.

3. The method of claim 1, wherein the lithium electrode is a plate electrode composed of pure lithium.

4. The method of claim 1, wherein the reference electrodes subjected to formation include lithium ions received from the lithium electrode in the processes (ii) and (iii).

5. The method of claim 1, wherein in the reference cell, each of the reference electrodes work as a positive electrode of the reference cell, and the lithium electrode forms a negative electrode of the reference cell, and each of the reference electrodes is independently subjected to formation in the process (iii).

6. The method of claim 1, further comprising:

(a) forming the reference cell with a sample electrode identical to the reference electrodes and the lithium electrode, and then performing formation of an electrode potential of the sample electrode identically to the processes (ii) and (iii), thereby predetermining formation conditions including a microcurrent size, charge time, discharge time and/or formation time, wherein the processes (i) to (iii) are carried out, based on the formation conditions predetermined in the process (a).

7. The method of claim 1, wherein during the manufacturing of each of the n battery cells, the process (iv) includes mounting the respective one of the reference electrodes between a respective separator and the respective negative electrode, with the respective one of the reference electrodes facing the respective negative electrode, laminating the respective positive electrode thereon with the respective separator interposed therebetween so that the positive electrode faces the negative electrode and the respective one of the reference electrodes, thereby forming the respective electrode assembly, and storing the respective electrode assembly and the electrolyte solution in the respective battery case, and then sealing the respective battery case, thereby manufacturing the respective battery cell.

8. The method of claim 1, wherein each of the reference electrodes includes:

a main body having a wire structure composed of copper (Cu) or aluminum (Al);

an electrode portion disposed on one side end part of the main body, and having an electrode active material coated on a surface; and a separation film configured to prevent an electric short circuit between the electrode portion and the respective positive or negative electrode, and configured to allow migration of lithium ions between the respective positive electrode and the electrode portion.

9. The method of claim 8, wherein the main body has an electrically insulating film or a resin coated on a remaining portion except the electrode portion.

10. The method of claim 8, wherein each of the reference electrodes is mounted on the respective electrode assembly so that another side end part of the main body opposite the one side end part is extended to an outside of the respective battery case, with the electrode portion being interposed between the respective separator and the respective negative electrode.

11. The method of claim 8, wherein the electrode active material is lithium titanium oxide (LTO).

12. The method of claim 8, wherein the electrode active material of each of the reference electrodes is included in the respective reference electrode at 0.001% by weight to 5% by weight, based on a total weight of a negative electrode active material of the respective negative electrode.

13. The method of claim 8, wherein the electrode portion of each of the reference electrodes has a thickness of 0.1% to 20%, relative to a thickness of the respective negative electrode.

14. The method of claim 8, wherein the separation film is composed of a material selected from the group consisting of organic/inorganic composite porous SRS separators (safety-reinforcing separators), a polyolefin-based polymer, a polyester-based polymer, a polycarbonate-based polymer and glass fiber.

15. The method of claim 8, wherein the separation film of each of the reference electrodes has a thickness of 10% to 50%, relative to a thickness of a separator of the respective battery cell.

16. The method of claim 8, wherein the separation film has a cap shape wrapping the electrode portion.

* * * * *